United States Patent
Zhitnitsky

(12) United States Patent (10) Patent No.: US 7,917,170 B2
Zhitnitsky (45) Date of Patent: Mar. 29, 2011

(54) MULTIPLE-BAND RADIO FREQUENCY (RF) CIRCUIT AND METHOD FOR A WIRELESS COMMUNICATION DEVICE

(75) Inventor: Gene E. Zhitnitsky, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 562 days.

(21) Appl. No.: 12/048,118

(22) Filed: Mar. 13, 2008

(65) Prior Publication Data
US 2009/0233642 A1    Sep. 17, 2009

(51) Int. Cl.
*H04M 1/00* (2006.01)
(52) U.S. Cl. ............... 455/552.1; 455/550.1; 455/553.1
(58) Field of Classification Search ............... 455/550.1, 455/552.1, 553.1
See application file for complete search history.

(56) References Cited

U.S. PATENT DOCUMENTS

| | | | |
|---|---|---|---|
| 6,188,877 B1 | 2/2001 | Boesch | |
| 7,035,602 B2 * | 4/2006 | Satoh et al. | 455/118 |
| 7,202,736 B1 * | 4/2007 | Dow et al. | 330/129 |
| 2002/0151291 A1 | 10/2002 | Toncich | |
| 2004/0048634 A1 | 3/2004 | Satoh | |
| 2004/0208137 A1 | 10/2004 | Martinez | |
| 2004/0209583 A1 | 10/2004 | Forrester et al. | |

FOREIGN PATENT DOCUMENTS

| | | |
|---|---|---|
| EP | 1152543 A | 11/2001 |
| WO | WO99/60710 A | 11/1999 |
| WO | WO01/24388 A | 4/2001 |
| WO | WO01/97389 A | 12/2001 |
| WO | WO03/071699 A | 8/2003 |
| WO | WO2004/015881 A | 2/2004 |

OTHER PUBLICATIONS

Daehyun Kang et al: "A Highly Efficient and Linear Class-AB/F Power Amplifier for Multimode Operation" IEEE Transactions on Microwave Theory and Techniques, IEEE Service Center, Piscataway, NJ, US, vol. 56, No. 1, Jan. 1, 2008 pp. 77-87, XP011197901 ISSN: 0018-9480.
Dalmia S et al: "Global Universal Radio Units (GURU) Realized Using Multilayer Organics (MLO)" Electronic Components and Technology Conference, 2007. ECTC '07. Proceedings. 57TH, IEEE, PI, May 1, 2007, pp. 979-985, XP 031180617 ISBN:978-1-4244-0984-6.

* cited by examiner

*Primary Examiner* — Tuan H Nguyen

(57) ABSTRACT

A multi-band wireless communication device includes a plurality of transmit paths outputting signals to one or more antennas and one or more power amplifiers coupled to the transmit paths. Each of the transmit paths is configured to transmit signals on a specific radio frequency (RF) band. The RF bands can include the Advanced Wireless Services (AWS) band and the Personal Communication Service (PCS) band. Passive filters, such as SAW, BAW or FBAR devices, having out-off-band low return losses are included in the transmit paths. The passive filter and phase shifters on each transmit path can be configured so that RF switching between transmit paths is not necessary and a single power amplifier can be used for the different RF bands. Significant cost, power and space savings can be achieved by reducing the need for RF switches and using a single power amplifier to amplify plural RF bands.

13 Claims, 3 Drawing Sheets

MULTIPLE-BAND RADIO FREQUENCY (RF) CIRCUIT AND METHOD FOR A WIRELESS COMMUNICATION DEVICE

FIELD OF THE INVENTION

The invention relates generally to wireless communications systems, and more specifically, to an improved radio frequency (RF) front-end architecture for multi-band wireless mobile devices.

BACKGROUND

Around the globe, commercial wireless communication services such as cellular phone services and data services are proliferating onto an increasing number of RF bands. These RF bands generally represent RF spectrum allocated to such use by governmental authorities.

In the United States, for example, cellular and data services are currently available on the cellular band or Advanced Mobile Phone System (AMPS) band and the Personal Communication Service (PCS) band. In addition, the unlicensed WiFi (802.11x) and Bluetooth bands are also available for providing wireless services. The WiFi band operates at approximately 2450 MHz and 5800 MHz at the industrial, scientific and medical (ISM) radio bands, and Bluetooth operates at approximately 2450 MHz, also in the ISM bands. The Advanced Wireless Services (AWS) band has also recently become available for providing commercial wireless services; and MediaFLO™ is a relatively new wireless technology to broadcast data to portable devices. In the United States, the MediaFLO™ system uses frequency spectrum at approximately 700 Mhz.

To more fully utilize multiple RF bands, it is desirable to have a portable, multi-band wireless device that is capable of transmitting and receiving signals on different RF bands. A multi-band wireless device represents an integration of various wireless technologies into a single portable device. Unfortunately, conventional approaches to integrating certain wireless technologies within portable devices have proven to be relatively costly in terms of components, power consumption, and physical size.

SUMMARY

It is an advantage of the present invention to provide a multi-band wireless communication device that offers significant cost, power and space savings. In accordance with an exemplary embodiment of the invention, the wireless communication device includes a plurality of transmit paths outputting signals to one or more antennas and a power amplifier coupled to the transmit paths. Each of the transmit paths is configured to transmit signals on a specific radio frequency (RF) band. The RF bands can include any suitable frequency bands, such as the Advanced Wireless Services (AWS) band and the Personal Communication Service (PCS) band. The power amplifier amplifies signals associated with each of the transmit paths. In this particular embodiment, significant cost, power and space savings are achieved by using a single power amplifier to amplify transmissions on plural RF bands.

The invention is not limited to the above exemplary embodiment. Other advantages and embodiments of the invention will be or will become apparent to one with skill in the art upon examination of the following figures and detailed description. It is intended that all such additional advantages and embodiments be included within this description, be within the scope of the invention, and be protected by the accompanying claims.

BRIEF DESCRIPTION OF THE DRAWINGS

It is to be understood that the drawings are solely for purpose of illustration and do not define the limits of the invention. Furthermore, the components in the figures are not necessarily to scale, emphasis instead being placed upon illustrating the principles of the invention. In the figures, like reference numerals designate corresponding parts throughout the different views.

DETAILED DESCRIPTION

The following detailed description, which references to and incorporates the drawings, describes and illustrates one or more specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
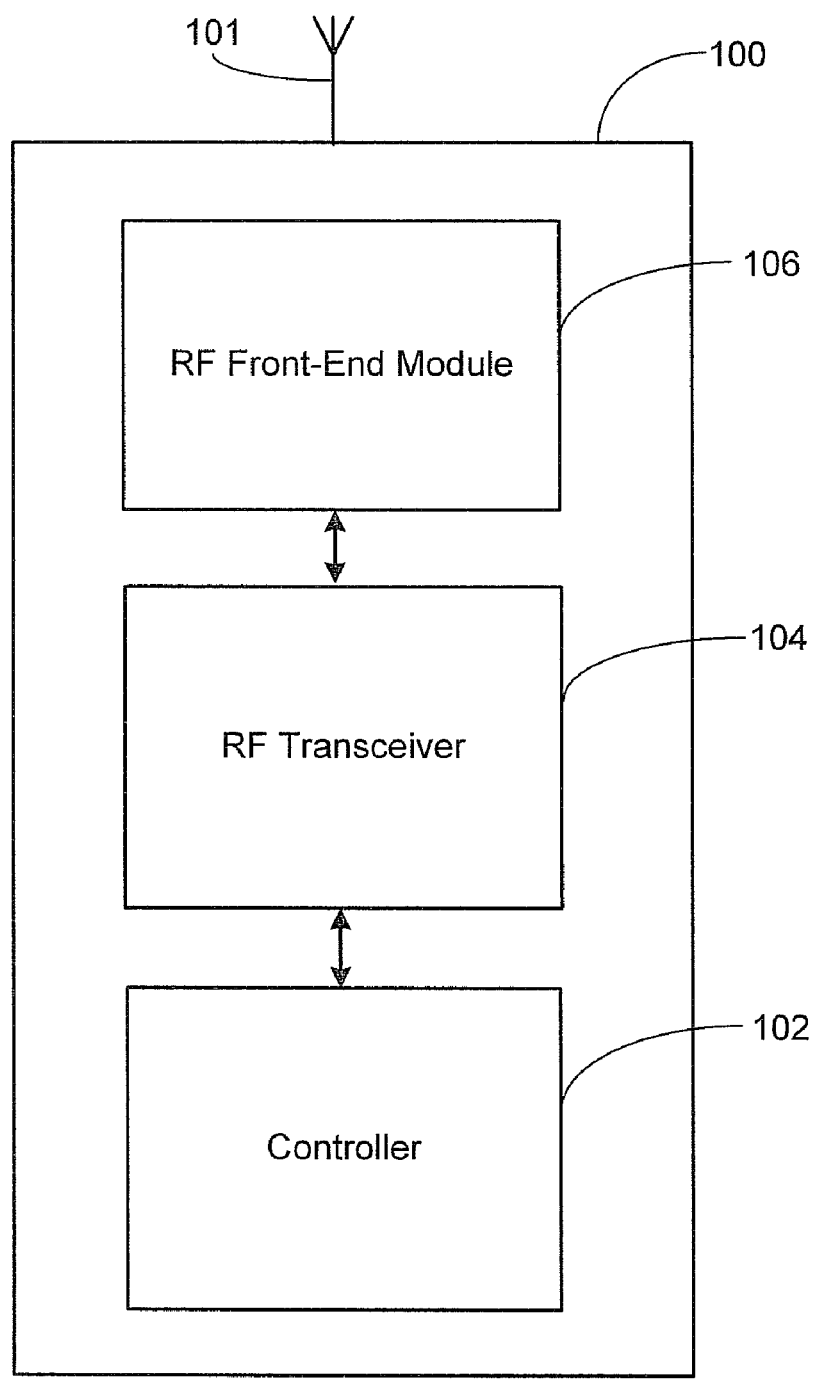
FIG. 1 is a block diagram of a wireless communication device that includes either of the multi-band RF circuits shown in FIG. 2 or 3, in accordance with an exemplary embodiment of the present invention.
Figure 2:
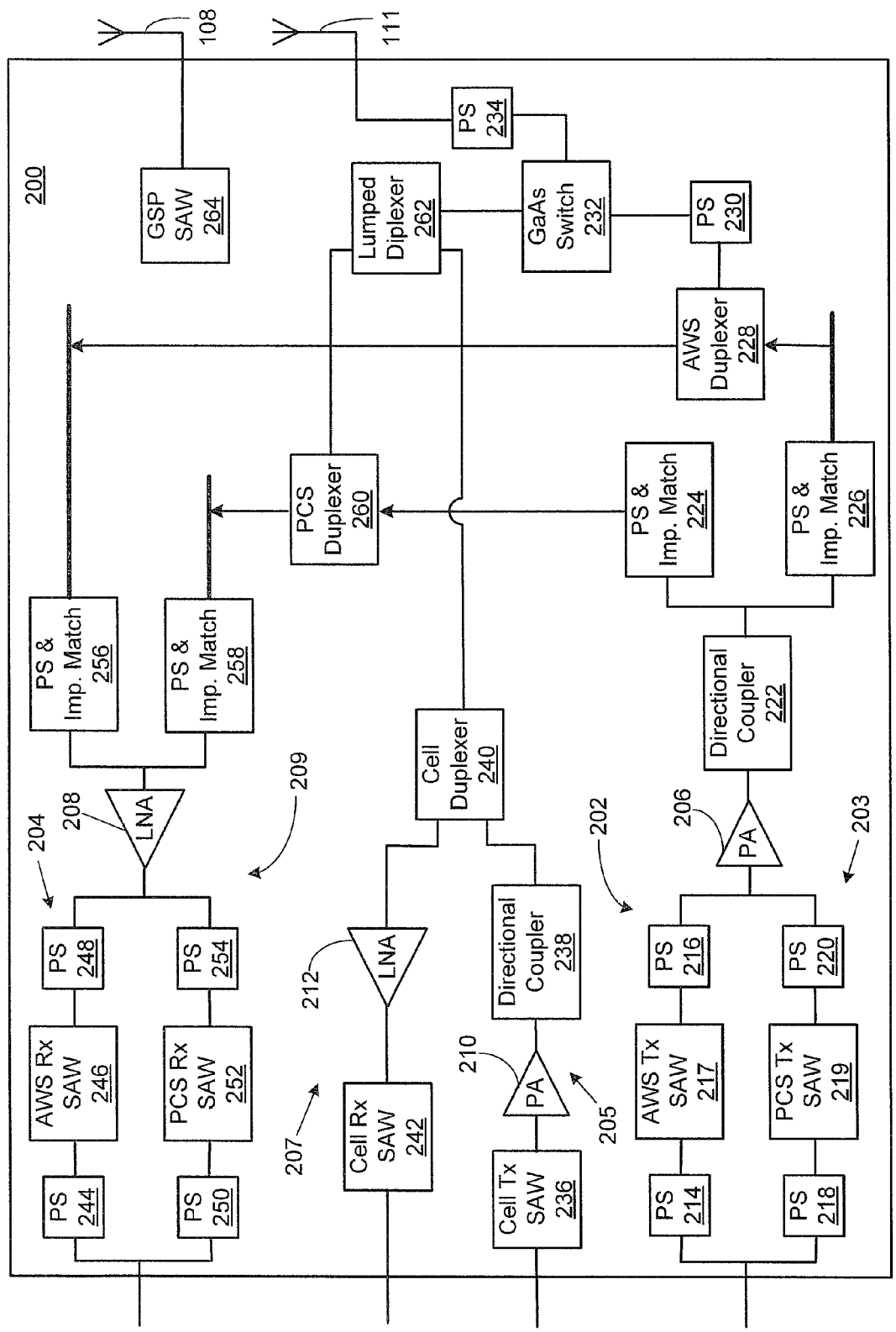
FIG. 2 is a detailed block diagram of a front-end RF circuit in accordance with another exemplary embodiment of the present invention.
Figure 3:
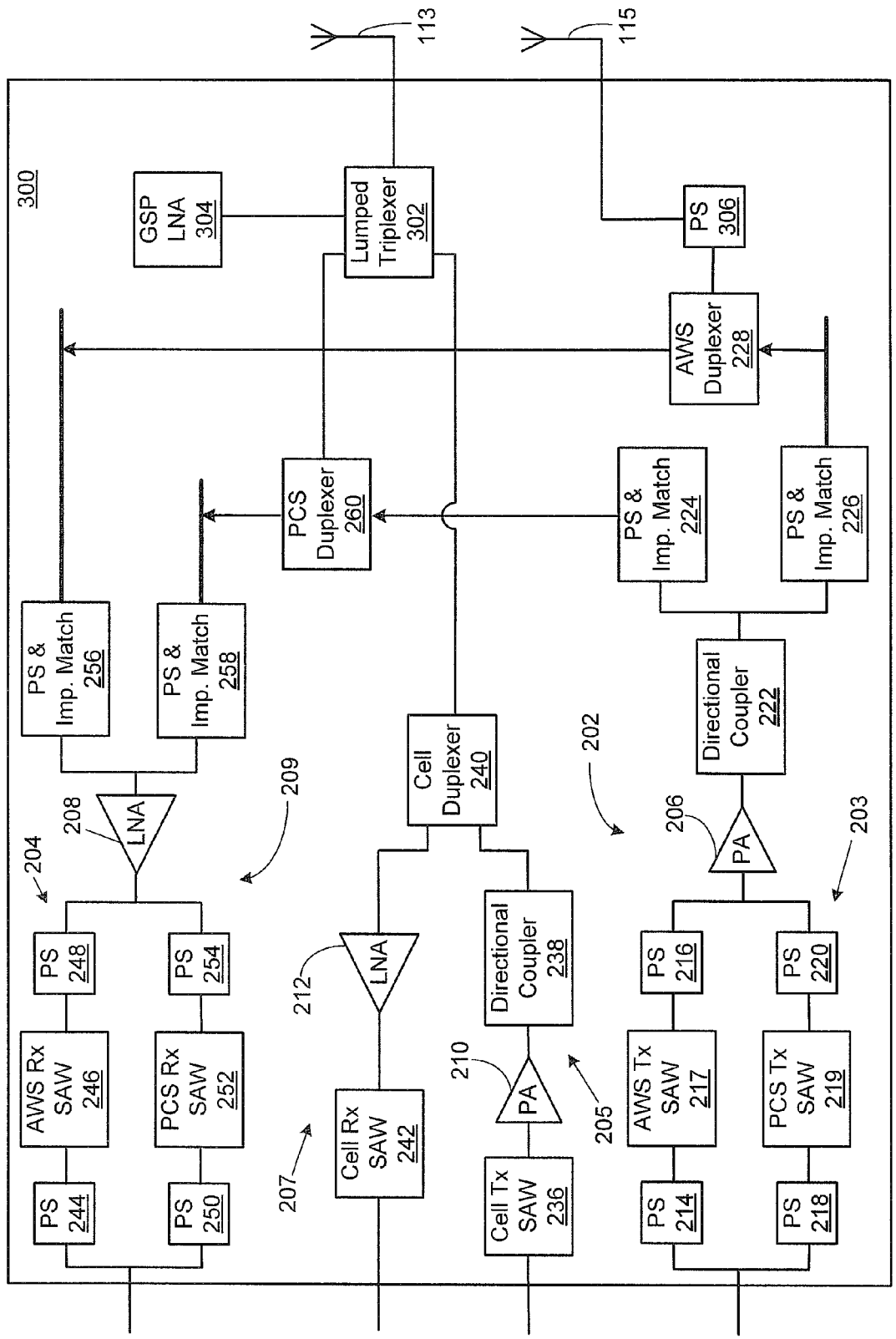
FIG. 3 is a detailed block diagram of an alternative front-end RF circuit in accordance with a further exemplary embodiment of the present invention.

FIG. 1 is a block diagram of an exemplary wireless communication device 100 that includes either of the multi-band front-end RF circuits 200, 300 shown in FIG. 2 or 3. The wireless communication device 100 can, for example, be a wireless handset, a car phone, a cordless phone, a laptop computer or other computing device with a wireless modem, a pager, or a personal digit assistance (PDA) with wireless communication capability. Further, the wireless communication device 100 can use digital or analog technology, or any suitable combination thereof. Thus, the following detailed description should not be interpreted as limiting the circuits described herein to any particular type of wireless communication device.

The wireless communication device 100 is adapted to receive and transmit wireless communication signals using at least two different communication bands. The bands can include, for example, the cellular band or Advanced Mobile Phone System (AMPS) band, which has bandwidth at 824-894 MHz; the Personal Communication Service (PCS) band, which has a bandwidth at 1850-1990 MHz; and the Advanced Wireless Services (AWS) band, which has bandwidths at 1710-1755 and 2110-2155 MHz. In addition, the wireless communication device 100 can transmit and receive signals on the MediaFLO™ band, WiFi band and Bluetooth bands; as well as receive Global Positioning System (GPS) signals at approximately 1575 MHz.

It will be appreciated that more or fewer communication bands, or different bands, can be accommodated by appropriate selection of antennas and associated circuitry. For example, the wireless communication device 100 can be constructed to use only the PCS and AWS bands, or it can be constructed to receive and transmit signals on additional communication bands, beyond the cellular, PCS, AWS, Media-FLO, WiFi, Bluetooth and GPS bands, or on different bands, such as those used outside of North America.

The wireless communication device 100 includes at least one antenna 101, a controller 102 having a processor and memory (not shown), a radio frequency (RF) transceiver 104 having a transmitter and a receiver (not shown), and an RF front-end module 106. Within the wireless communication device 100, there are a plurality of transmit paths (see, e.g., transmit paths 202, 203 and 205 of FIGS. 2 and 3). Each of the transmit paths is configured to transmit signals on a certain RF band. A power amplifier (see, e.g., power amplifier 206 of FIGS. 2 and 3) is coupled to each of the transmit paths. The power amplifier is configured to amplify the signals on each of the transmit paths. Thus, a single power amplifier is used to amplify transmissions on plural RF bands. This architecture significantly reduces the number of components, size and power consumption of circuitry within the wireless communication device 100.

The controller 102 performs, among other things, baseband processing on digitized communication signals. The controller memory stores one or more software programs executed by the controller 102 to perform its functions.

The RF transceiver 104 includes an RF transmitter and receiver for passing communication signals between the controller 102 and RF front-end module 106.

The controller 102, RF transceiver 104 and some components of the RF front-end module 106 (e.g., low noise receiver amplifiers) can be integrated into a single chip, such as part no. QSC6055, available from Qualcomm Corporation. Alternatively, the controller 102, RF transceiver 104 and RF front-end module 106 can be implemented using any suitable combination of components, including one or more digital signal processors (DSPs), standard components, and/or application specific integrated circuits (ASICs).

The RF front-end module 106 is coupled to the antennas 101 and the RF transceiver 104. The RF front-end module 106 generally provides amplification, filtering, phase shifting and impedance matching for RF signals that are transmitted or received by the wireless communications device 100. Details of circuitry 200, 300 that can be included in the RF front-end module 106 are discussed below in connection with FIGS. 2 and 3.

FIG. 2 is a detailed block diagram of a first RF front-end circuit 200 that can be included in the RF front-end module 106. The RF front-end circuit 200 is capable of transmitting and receiving signals on the cellular, AWS and PCS bands, and receiving GPS signals.

The RF front-end circuit 200 includes an AWS transmit path 202, a PCS transmit path 203, a cellular transmit path 205, an AWS receive path 204, a PCS receive path 209 and a cellular receive path 207.

The AWS transmit path 202 includes at least a first AWS-path phase shifter (PS) 214, an AWS transmit (Tx) surface acoustic wave (SAW) filter 217 and a second AWS-path PS 216. The PCS transmit path 203 includes at least a first PCS-path phase shifter (PS) 218, a PCS Tx SAW filter 219 and a second PCS PS 220. AWS and PCS RF transmission signals are received on a common input to the first phase shifters 214, 218 of AWS and PCS transmit paths 202, 203.

Preferably, the AWS-path phase shifters 214, 216 are each configured to phase shift the PCS transmission signal so that the AWS transmit path 202 presents a desired level of impedance to the to PCS transmission signal. Likewise, the PCS-path phase shifters 218, 200 are configured to phase shift the AWS transmission signal so that the PCS transmit path 203 presents a desired level of impedance to the to AWS transmission signal.

Generally, AWS Tx and PCS Tx SAW filters 217, 219 have low out-of-band (off-band) return losses. When the AWS and PCS Tx SAW filters 217, 219 are combined with the AWS-path and PCS-path phase shifters 214, 216, 218, 220 as shown, it is possible filter and amplify the AWS and PCS transmission signals without using an RF switch to select between the AWS Tx and PCS Tx paths 202, 203 and also using the single PA 206.

The outputs of the second AWS-path PS 216 and second PCS-path PS 220 are coupled to a power amplifier (PA) 206. The PA 206 is configured to amplify the phase-shifted AWS band transmission signal and the phase-shifted PCS band transmission signal output by the AWS and PCS transmit paths 202, 203, respectively. Although a single PA 206 is shown in FIGS. 2 and 3, other embodiments may use plural power amplifiers, e.g., a separate power amplifier may be used for each of the AWS and PCS Tx signals.

A directional coupler 222 receives the output of the PA 206. The directional coupler 222 is configured to respectively couple the amplified AWS band and PCS band transmission signals to the AWS Tx phase shifter and impedance matching circuit 226 and the PCS phase shifter and impedance matching circuit 224.

AWS transmission signals output from the AWS phase shifter and impedance matching circuit 226 are provided to an AWS duplexer 228. From the AWS duplexer 228, the AWS transmission signals pass through a third AWS phase shifter 230, and then to a GaAs switch 232. The GaAs switch 234 outputs the AWS transmission signals to an antenna phase shifter 234, which outputs them to an antenna 111, where the AWS transmission signals are finally broadcast from the wireless communication device 100.

PCS transmission signals output from the PCS phase shifter and impedance matching circuit 224 are provided to a PCS duplexer 260, which passes the PCS transmission signals to a lumped diplexer 262. From the lumped diplexer 262, the PCS transmission signals are output to the GaAs switch 232. The GaAs switch 234 outputs the PCS transmission signals antenna phase shifter 234, which outputs them to an antenna 111, where the PCS transmission signals are finally broadcast from the wireless communication device 100.

Downlink AWS, PCS and cellular signals are received at the antenna 111. These received RF signals pass through the antenna phase shifter 234. The GaAs switch 232 is configured to separate received AWS signals from received PCS and cellular signals.

From the GaAs switch 232, the received AWS signals pass through the third AWS phase shifter 230 to the AWS duplexer 228, where they are then passed to the AWS receiver (Rx) phase shifter and impedance matching circuit 256.

The received PCS signals pass from the GaAs switch 232 to the lumped diplexer 262, and then to the PCS duplexer 260. From the PCS duplexer 260 the received PCS signals pass to the PCS Rx phase shifter and impedance matching circuit 258.

The outputs of the AWS and PCS Rx phase shifter and impedance matching circuits 256, 258 are coupled as a common input to a low noise amplifier (LNA) 208. The output of the LNA 208 is coupled to the AWS receive path 204 and the PCS receive path 209.

The AWS receive path 204 includes a first AWS phase shifter (PS) 248, an AWS receiver (Rx) surface acoustic wave (SAW) filter 246 and a second AWS PS 244. The PCS receive path 209 includes a first PCS phase shifter (PS) 254, a PCS Rx SAW filter 252 and a second PCS PS 250. The received AWS and PCS RF signals are output on a common single-ended or differential output to the RF transceiver 104.

The cellular RF front-end circuitry includes the cellular transmit path 205 and cellular receive path 207. The cellular transmit path 205 comprises a cellular Tx SAW filter 236, a PA 210 and directional coupler 238. The cellular receive path 207 includes a cellular LNA 212 and cellular Rx SAW filter 242. The cellular directional coupler 238 and LNA 212 are coupled to a cellular duplexer 240. Cellular transmit and receive signals pass between the cell duplexer 240 and the antenna 111 through the lumped diplexer 262, GaAs switch 232, and antenna PS 234.

A GPS SAW filter 264 is coupled to a separate GPS antenna 108 for receiving GPS signals.

The Tx, Rx and GPS SAW filters 217, 219, 236, 242, 246, 252, 264 are commercially-available RF SAW filters configured to bandpass filter their respective band signals. Generally, SAW filters have a low out-of-band (off-band) return loss, which makes it possible combine the AWS and PCS transmission signals so that they are amplified by the single PA 206 and coupled to their respective duplexers 228, 260 using the single directional coupler 222.

Although the RF front-end circuits 200, 300 are illustrated as including SAW filters, other types of suitable filters may be used instead. For example, bulk acoustic wave (BAW) filters or film bulk acoustic resonators (FBARs) may be used as an alternative to SAW filters. Additionally, any suitable combination of SAW filters, BAW filters or FBARs may also be used.

FBARs can be used to achieve high Q filters with very small footprints. Like SAW devices, FBAR devices convert electrical signals into mechanical waves that resonate through the filter material and are then converted back to electrical signals at the appropriate output. But unlike SAW filters, the mechanical waves travel through the body of the material not just across the surface. This allows superior power handling and operation at frequencies as high as 7.5 Ghz. Moreover, FBAR devices can be made extremely small.

The power amplifier 206 can be any suitable wideband PA capable of amplifying RF signals in the AWS and PCS bands, including part no. AWT6332 from Anadigics, Incorporated. The cellular PA 210 can be any suitable wideband PA capable of amplifying RF signals in the cellular band, such as part no. AWT6331 from Anadigics, Incorporated.

The directional couplers 222, 238 are preferably off-the-shelf components suitable for their respective RF bands, such as certain directional couplers available from AVX Corporation.

The low noise amplifiers 208, 212 are preferably integrated into a single chip cellular solution, such as part no. QSC6055 from Qualcomm Corporation.

The AWS duplexer 228, cellular duplexer 240, and PCS duplexer 260 each isolate their respective receive and transmit paths from each other so that the transmitters and receivers can share the same antenna 111. The AWS duplexer 228, cellular duplexer 240, and PCS duplexer 260 are preferably off-the-shelf components suitable for their respective RF bands.

The GaAs switch 232 selectively switches between the AWS band and the PCS or cellular bands, depending which band the wireless communication device 100 is operating on. When the wireless communication device 100 is operating on the AWS band, the GaAs switch 232 couples the AWS duplexer 228 to the antenna 111. When the wireless communication device 100 is operating on either the PCS or cellular band, the GaAs switch 232 couples the diplexer 262 to the antenna 111. The setting of the GaAs switch 232 is controlled by the controller 102. The GaAs switch 232 is preferably an off-the-shelf component.

The lumped diplexer 262 separates the cellular band and PCS band.

The phase shifters 214, 216, 218, 220, 230, 234, 244, 248, 250, 254 are any suitable devices that adjust the phase of or present impedance to RF signals at certain nodes in the RF circuit 200 to desired values. The phase shifters 214, 216, 218, 220, 230, 234, 244, 248, 250, 254 can include active devices, such as GaAs switches, and/or passive components, i.e., inductors, capacitors and/or resistors, connected in known configurations, such as pi or tee networks.

The phase shifter and impedance matching circuits 224, 226, 256, 258 perform phase shifting as well as impedance matching for RF signals passing through the circuit 200. The phase shifter and impedance matching circuits 224, 226, 256, 258 can include active devices, such as GaAs switches, and/or passive components, i.e., inductors, capacitors and/or resistors, connected in known configurations, such as pi or tee networks.

The antennas 101 include the GPS antenna 108 and the tri-band antenna 111 constructed to receive and transmit wireless signals on the AWS, PCS and cellular bands.

FIG. 3 is a detailed block diagram of an alternative RF front-end circuit 300 that can be included in the RF front-end module 106, as an alternative to the first RF front-end circuit 200. Like the first RF front-end circuit 200, the alternative front-end circuit 300 is capable of transmitting and receiving signals on the cellular, AWS and PCS bands, and receiving GPS signals. However, in contrast to the first RF front-end circuit 200, the alternative RF front-end circuit 300 uses a different antenna arrangement. The RF front-end circuit 300 uses a tri-band antenna 113 for the PCS, cellular and GPS bands, and a separate AWS antenna 115 for the AWS band. In this architecture, the AWS duplexer 228 is coupled to the AWS through a phase shifter 306, and a lumped triplexer is used to couple the antenna 113 to the cellular duplexer 240, PCS duplexer 260 and GPS low noise amplifier (LNA) 304.

The lumped triplexer 302 separates the PCS, cellular and GPS RF bands from one another, and it is preferably an off-the-shelf component.

Other embodiments and modifications of the invention will readily occur to those of ordinary skill in the art in view of the foregoing teachings. Thus, the above summary and detailed description is illustrative and not restrictive. The invention is to be limited only by the following claims, which include all such embodiments and modifications when viewed in conjunction with the above specification and accompanying drawings. The scope of the invention should, therefore, not be limited to the above summary and detailed description, but should instead be determined by the appended claims along with their full scope of equivalents.

What is claimed is:

1. A radio frequency (RF) circuit, comprising:
a first Advanced Wireless Services (AWS)-path phase shifter receiving an AWS band transmission signal and a PCS band transmission signal;
a first Personal Communication Service (PCS)-path phase shifter receiving the AWS band transmission signal and the PCS band transmission signal;
a first filter, coupled to the first AWS-path phase shifter, configured to bandpass filter the AWS band transmission signal; and
a second filter, coupled to the first PCS-path phase shifter, configured to bandpass filter the PCS band transmission signal;

a second AWS-path phase shifter coupled to the first filter;
a second PCS-path phase shifter coupled to the second filter; and
a power amplifier, coupled to the first AWS-path phase shifter and the second PCS-path phase shifter, configured to amplify the AWS band transmission signal and the PCS band transmission signal to generate an amplified AWS band signal and an amplified PCS band transmission signal.

2. The RF circuit of claim 1, included in a wireless communication device.

3. The RF circuit of claim 1, wherein the first and second filters each have a low out-of-band return loss.

4. The RF circuit of claim 1, further comprising:
a directional coupler, operatively coupled to an output of the power amplifier, configured to couple the amplified AWS band transmission signal and the PCS band transmission signal.

5. The RF circuit of claim 4, further comprising:
a PCS phase shifter and impedance matching circuit coupled to directional coupler.

6. The RF circuit of claim 4, further comprising:
an AWS phase shifter and impedance matching circuit coupled to directional coupler.

7. The RF circuit of claim 1, wherein the first AWS-path phase shifter is configured to present a predetermined impedance to the PCS band transmission signal.

8. The RF circuit of claim 1, wherein the first PCS-path phase shifter is configured to present a predetermined impedance to the AWS band transmission signal.

9. The RF circuit of claim 1, wherein the first filter is a first surface acoustic wave (SAW) filter and the second filter is second surface acoustic wave (SAW) filter.

10. The RF circuit of claim 1, wherein each of the filters is selected from the group consisting of a surface acoustic wave (SAW) filter, a bulk acoustic wave filter (BAW), a FBAR, and any suitable combination of the foregoing filters.

11. A method comprising:
receiving an Advanced Wireless Services (AWS) band transmission signal and a Personal Communication Service (PCS) band transmission signal;
phase shifting the AWS band transmission signal;
phase shifting the PCS band transmission signal;
AWS bandpass filtering the AWS band transmission signal after the AWS band transmission signal is phase shifted;
PCS bandpass filtering the PCS band transmission signal after the PCS band transmission signal is phase shifted;
phase shifting the AWS band transmission signal after AWS bandpass filtering;
phase shifting the PCS band transmission signal after PCS bandpass filtering; and
power amplifying the AWS band transmission signal and the PCS band transmission signal after the phase shifting and bandpass filtering.

12. The method of claim 11, wherein the phase shifting and filtering is performed in a wireless communication device.

13. The method of claim 11, wherein the AWS bandpass filtering comprises providing a low out of AWS band return loss and wherein PCS bandpass filtering comprises providing a low out of PCS band return loss.

* * * * *